(No Model.)
W. A. LIGON.
CARVING IMPLEMENT.
No. 342,617. Patented May 25, 1886.
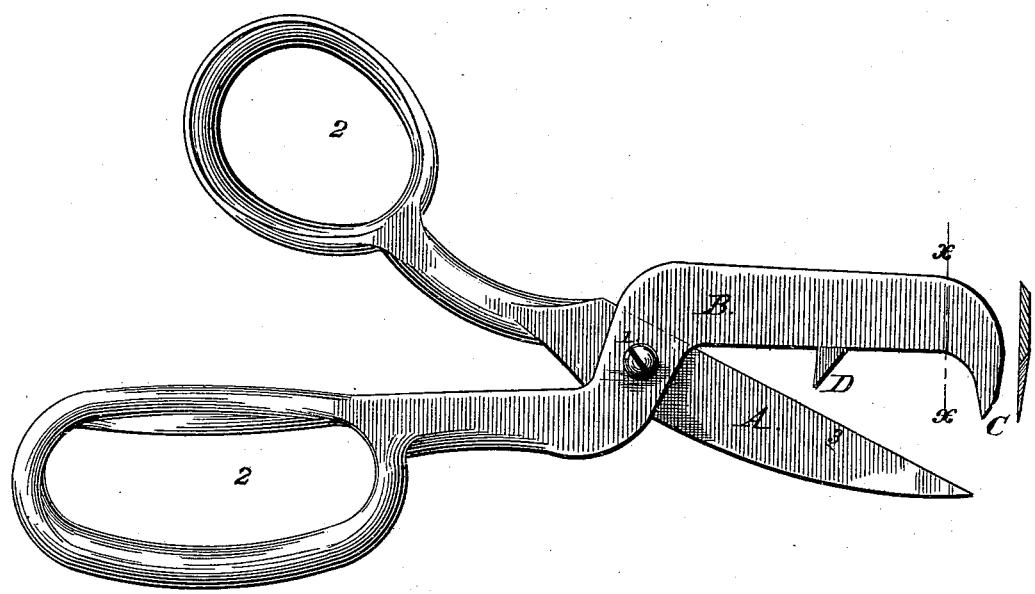
WITNESSES:
Fred G. Dieterich
P. B. Turpin
INVENTOR:
W. A. Ligon
BY Munn & Co
ATTORNEYS.

UNITED STATES PATENT OFFICE.

WILLIAM A. LIGON, OF SONORA, KENTUCKY, ASSIGNOR TO HIMSELF AND WILLIAM O. ALLEN, OF SAME PLACE.

CARVING IMPLEMENT.

SPECIFICATION forming part of Letters Patent No. 342,617, dated May 25, 1886.

Application filed March 19, 1886. Serial No. 195,875. (No model.)

*To all whom it may concern:*

Be it known that I, WILLIAM A. LIGON, of Sonora, in the county of Hardin and State of Kentucky, have invented a new and useful Improvement in Carving Implements, of which the following is a specification.

My invention is an improved carving implement; and it consists in certain features of construction and novel combinations of parts, as will be described.

In the drawing I have represented in side view an implement constructed according to my invention.

This implement consists of two arms or blades, A B, pivoted together at 1, scissor-like, and provided at their rear ends with suitable loops or hand-holds, 2 2, as shown. The blade A is formed at 3 with a cutting-edge. At the forward end of the arm B, I provide the inwardly-projected tooth C, and midway its pivot and the tooth C with a tooth, D. These teeth C D, I will refer to as the "end" tooth and the "intermediate" tooth.

In practice it is usual to make the implement about nine or ten inches long, the end tooth one-half inch long and the intermediate tooth one-third of an inch long; but it will be understood that larger and smaller implements may be made, and the proportions stated may be varied without departing from my invention.

The device is especially intended for carving poultry and game, such as turkeys, chickens, birds, squirrels, rabbits, &c. In use the end tooth will act to hold the flesh and small bones from slipping away from the knife or blade A when the latter is cutting. It will be noticed that the end of this blade is pointed, so it may be introduced into the flesh and between smaller bones to get a proper hold. The intermediate tooth is intended for use in separating the joints to admit the sharpened blade between them; also for fracturing the bones between the joints where so desired.

It is intended in the use of my implement that the object being carved shall be held and steadied by a fork, or in other suitable manner.

By this implement the legs and wings of poultry and birds can be cut off with the greatest ease; likewise the legs of squirrels, rabbits, and other like game.

Having thus described my invention, what I claim as new is—

As a new and improved article of manufacture, a carving implement, substantially as herein described and shown, consisting of two arms or blades pivoted together shear-like, one of said arms being provided at its forward end with a tooth, and between the same and the pivot with a second inwardly-projected tooth, and the other arm being formed with a cutting-edge and having its extremity pointed, whereby it may be inserted into the flesh being carved, substantially as set forth.

WILLIAM A. LIGON.

Witnesses:
  CHAS. FRIEND,
  J. R. HIGHBOUGH.